United States Patent [19]
May

[11] Patent Number: 4,893,125
[45] Date of Patent: Jan. 9, 1990

[54] VEHICLE DIPLEX DOPPLER NEAR-OBSTACLE DETECTION SYSTEM

[75] Inventor: Phillip A. May, Lompoc, Calif.

[73] Assignee: Delco Electronics Corporation, Goleta, Calif.

[21] Appl. No.: 265,624

[22] Filed: Nov. 1, 1988

[51] Int. Cl.⁴ .............................................. G01S 13/38
[52] U.S. Cl. ...................................... 342/129; 342/69; 342/84; 342/85
[58] Field of Search .................................. 342/69–72, 342/129, 84.85

[56] References Cited

U.S. PATENT DOCUMENTS

| | | |
|---|---|---|
| 3,750,171 | 7/1973 | Faris .......................................... 343/9 |
| 3,863,253 | 1/1975 | Kiyoto et al. ............................. 343/9 |
| 3,898,655 | 8/1975 | Tresselt . |
| 3,978,481 | 8/1976 | Angwin et al. . |
| 4,063,237 | 12/1977 | Nier et al. . |
| 4,101,888 | 7/1978 | Heller et al. . |
| 4,143,370 | 3/1979 | Yamanaka et al. . |
| 4,148,028 | 4/1979 | Fujiki . |
| 4,203,113 | 5/1980 | Baghdady . |
| 4,348,675 | 9/1982 | Senzaki et al. . |
| 4,388,622 | 6/1983 | Fletcher, Jr. . |
| 4,697,184 | 9/1987 | Cheal et al. ........................... 342/28 |
| 4,703,429 | 10/1987 | Sakata ................................ 342/70 X |

*Primary Examiner*—Thomas H. Tarcza
*Assistant Examiner*—John B. Sotomayor
*Attorney, Agent, or Firm*—Howard N. Conkey

[57] ABSTRACT

A vehicle near-obstacle detector in the form of a diplex Doppler radar system provides range information between a vehicle and an object based on the phase shift between a pair of Doppler signals derived from two transmitted radar signals at slightly different frequencies. A speed dependent error introduced by the time constant of a filter circuit converting duty cycle range information based on the phase shift to an analog signal is compensated by introducing a small time shift in the signal path of one of the Doppler signals to effect a shift in the duty cycle range information.

3 Claims, 3 Drawing Sheets

VEHICLE DIPLEX DOPPLER NEAR-OBSTACLE DETECTION SYSTEM

This invention relates to diplex Doppler obstacle detection system for a vehicle.

Obstacle detection system for providing an indication of the distance and/or warning of approaching objects are known. One application for such systems is for detecting objects in proximity to an automotive vehicle. For example, the vehicle may employ a near-obstacle detection system to alert the vehicle operator of the presence of obstacles behind the vehicle while backing the vehicle or to alert the vehicle operator of any obstacle in front of the vehicle below the operator's line of sight.

Various systems have been proposed for near-obstacle detection. One such system is commonly referred to as a diplex Doppler system having the capability of providing range and relative velocity between the vehicle and an object. In general, a diplex Doppler radar system transmits two separate RF signals differing only slightly in frequency and receives two echo signals which are reflected by an object in the vehicle path. Each reflected signal is mixed with the corresponding transmitted signal to produce a Doppler signal resulting from the relative motion between the vehicle and the object. Because of the small change in the wavelength of the transmitted signals, the two Doppler signals will be shifted in phase from one another by an amount that is a direct measure of the distance to the target.

For example, with a first RF frequency of 10.525 Ghz, a Doppler signal resulting from mixing the generated signal with a signal returned from an object will result in a 31.37 Hz/mi/hr Doppler frequency shift. A second RF signal having a frequency of 10.531 Ghz when mixed with a signal returned from an object will result in a Doppler frequency shift of 31.38 hz.m/i/hr. Because of the small change in wavelength, the phase of the first Doppler return signal will be slightly shifted in phase from the second Doppler return signal for a given target distance. The further the distance to the target, the greater the phase shift. In this example, a phase shift from zero to 70" corresponds to a range of 0 to 16 ft.

In order to extract the range information, the typical system provides for converting the two Doppler signals into two rectangular signals, which in turn are provided to the input terminals of an exclusive OR gate. The output of the gate is a signal having a duty cycle (the percentage of the pulse width to the overall signal cycle) that is a direct measure of the distance between the vehicle and the obstacle. The duty cycle modulated signal is then provided to a filter circuit whose output is an analog voltage having a magnitude representative of the range between the vehicle and the obstacle.

Characteristic of the foregoing system is that a large time constant filter is required in order to convert the duty cycle range information to a DC voltage range signal with acceptably low ripple. This results in a significant lag and therefore error in the signal indication of the range to a fast moving object.

SUMMARY OF THE INVENTION

In accord with this invention, a vehicle near-obstacle detector is provided in the form of a diplex Doppler radar system such as described above but which provides for accurate range information even for high relative velocities between the vehicle and an object.

In accord with the principles of this invention, it is recognized that the error introduced by the filter circuit converting the duty cycle signal to a DC voltage is in direct proportion to the relative speed between the vehicle and the object. Particularly, at low speeds the lag introduced by the filter circuit is small relative to the duty cycle signal cycle time thereby having little effect on the analog signal range indication. However, with increasing closing rates between the vehicle and the obstacle, the lag introduced by the filter circuit increasingly effects the analog signal range indication as the filter time constant increasingly becomes more significant relative to the duty cycle signal cycle time.

Since the range is calculated by the phase shift between the two Doppler signals, the subject invention provides for a closing rate dependent compensation to the lag of the duty cycle to DC conversion filter by introducing a small time shift in the signal path of one of the Doppler signals to effect a shift in the range indication provided at the output of the duty cycle to DC conversion filter. The phase shift of the Doppler signal path represented by this time shift is small at low Doppler signal frequencies corresponding to low closing velocities between the vehicle and the obstacle with the phase shift represented by the time shift increasing with increasing frequencies of the Doppler signal corresponding to increasing closing speeds between the vehicle and the obstacle. This increasing phase shift introduced by the time shift with increasing frequencies of the Doppler signal is a compensation for the increasing error introduced by the lag of the duty cycle to DC conversion filter with increasing frequencies of the Doppler signals. In this manner, the error of the duty cycle to DC conversion filter may be substantially eliminated over the Doppler frequency range of the radar system.

DESCRIPTION OF THE DRAWINGS

The invention may be best understood by reference to the following description of a preferred embodiment of the invention and the drawings in which.

DESCRIPTION OF A PREFERRED EMBODIMENT

Figure 1:
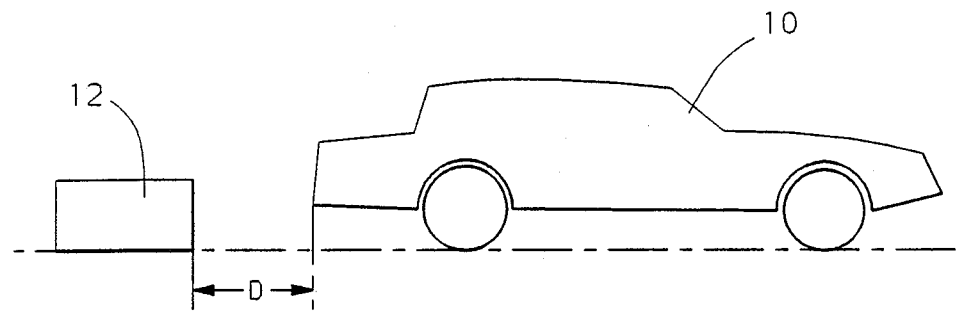
FIG. 1 depicts the application of the near-obstacle detection system of this invention to sensing an object behind an automotive vehicle.

The near-obstacle detection system of this invention is illustrated in FIG. 1 as applied to an automotive vehicle 10 for sensing an obstacle 12 located at a distance D from the rear of the vehicle. As can be appreciated, it is desirable to provide to the vehicle operator an indication of the presence of the obstacle 12 and its distance D from the vehicle 10 when the vehicle 10 is in reverse and being backed toward the obstacle. The radar system in this embodiment provides a signal (audio, visual or both) having a frequency that is indicative of the distance D of the obstacle behind the vehicle. It is, of course, understood that the radar system may be used to detect objects in proximity to the vehicle other than rearward, such as for objects that are in front of the vehicle that may be below the operator's line of sight.

The radar system utilized in the vehicle 10 of FIG. 1 is, as previously described, a diplex Doppler continuous wave radar system. In this form of system, two continuous wave signals of slightly different frequency are transmitted, reflected from an object such as the obstacle 10 and mixed with the corresponding transmitted signals. A pair of Doppler signals result from relative motion between the vehicle and the obstacle 12. The phase difference between the Doppler signals is a direct measure of the distance between the vehicle 10 and the obstacle 12.

Figure 2:
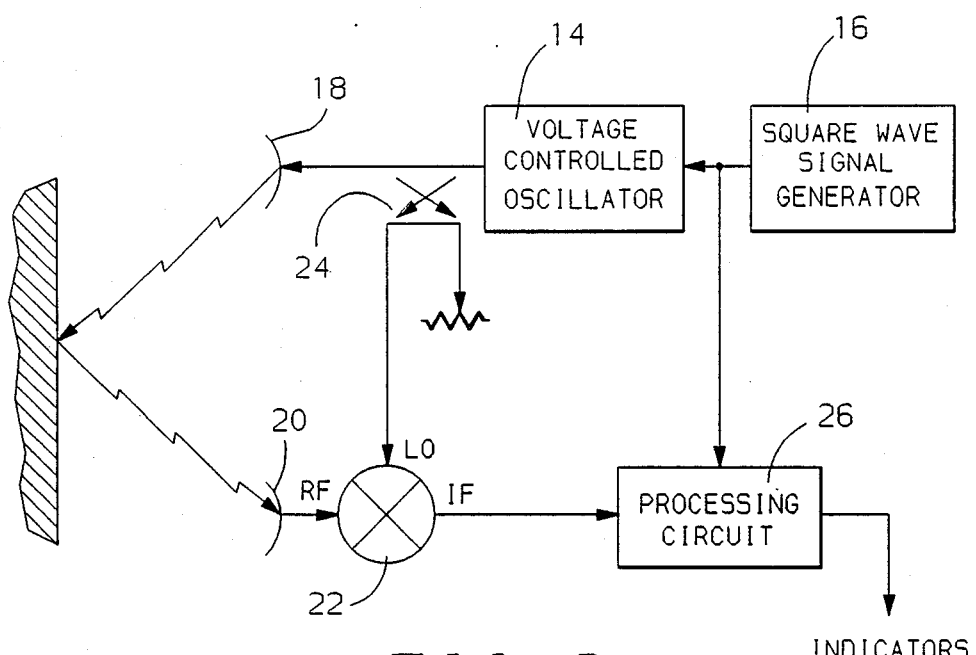
FIG. 2 is a diagram illustrating the transmitted and received RF signals from a diplex Doppler radar system carried by the vehicle of FIG. 1.

Referring to FIG. 2, the diplex Doppler radar system is generally illustrated as including a voltage controlled oscillator (VCO) 14 for generating RF signals. The VCO 14 is modulated by the output of a squarewave signal generator 16 providing alternating voltage levels to the VCO 14 so as to alternately generate two RF signals slightly shifted in frequency. In this embodiment, it will be assumed the voltage output of the squarewave signal generator 16 shifts between two voltages which cause the RF signal output of the VCO 14 to switch between RF frequencies of 10.525 Ghz and 10.531 Ghz. The squarewave signal generator 16 may take the form of a Schmidt-trigger oscillator squarewave generator having a 30 microsecond period and a variation of 25 millivolts peak-to-peak.

The RF signal output of the voltage controlled oscillator 14 is provided to a transmitting antenna 18 which transmits the continuous wave RF signal alternating between the two frequencies rearward from the vehicle 10. If an object, such as the obstacle 12, is present behind the vehicle, the transmitted signal is reflected and received by a receiving antenna 20. The received RF signal is coupled from the antenna 20 to an RF input of a conventional mixer 22. A local oscillator signal LO is provided to the mixer 22 from the output of the voltage controlled oscillator 14 by means of a coupler 24.

The output of the mixer 22 is an IF signal comprising the Doppler signals associated with each of the frequencies of the RF signal provided by the VCO 14. This IF signal is provided to a processing circuit 26 which functions in accord with this invention to provide audible and/or visual indications of the range D between the vehicle 10 and the obstacle 12.

The Doppler frequency at the output of the mixer 22 when the RF signal output of the VCO 14 is at the higher frequency is slightly greater than the frequency of the Doppler signal output of the mixer 22 when the frequency of the RF signal output of the VCO 14 is at the lower frequency. As will be described, by detecting the phase shift between these two Doppler signals range to the obstacle 12 may be determined.

Figure 3:
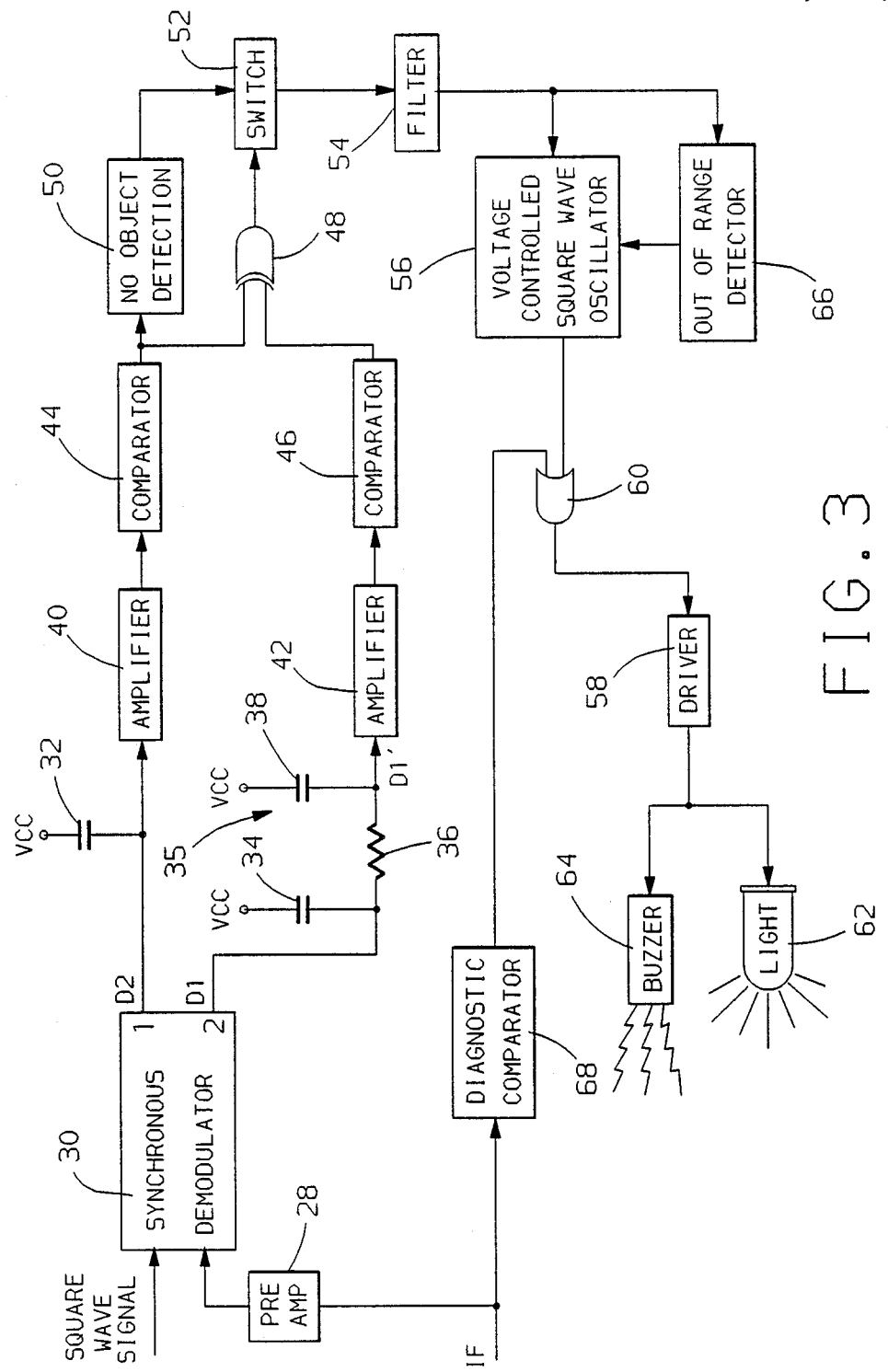
FIG. 3 is a general diagram of the diplex Doppler near-obstacle detection system incorporating the principles of this invention.

Referring to FIG. 3, details of the processing circuit 26 are illustrated. The IF signal from the mixer 22 is provided to a wide band preamplifier 28 whose output is coupled to a synchronous demodulator 30 driven by the squarewave VCO modulation signal output of the generator 16. This signal is provided to the switch input of the synchronous demodulator 30. By using the same squarewave signal from the generator 16 used to control the VCO 14, the synchronous demodulator 30 provides for separation of the Doppler signals associated with the two frequencies of the RF signal output of the VCO 14. Particularly, the synchronous demodulator provides on one output a Doppler signal D1 having a frequency F1 associated with the higher RF signal frequency 10.531 Ghz and provides on a second output a Doppler signal D2 having a frequency F2 associated with the lower RF signal frequency 10.525 Ghz.

Figure 4:
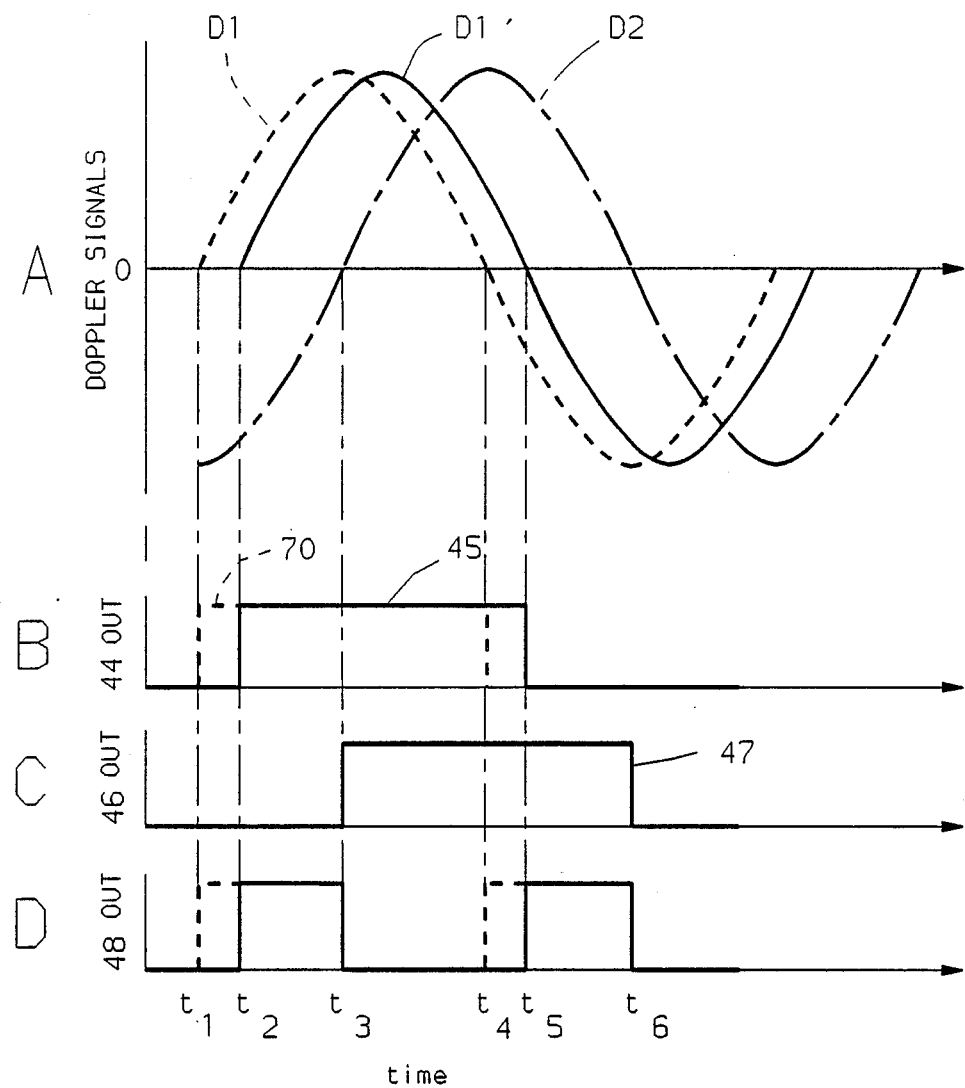
FIG. 4 illustrates diagrams of various waveforms of the system of FIG. 3.

In order to provide for substantially continuous wave Doppler signals, the Doppler signal D2 output of the second channel of the synchronous demodulator is held during the period the first channel is selected by means of a capacitor 32 coupled to a regulated voltage source VCC. The capacitor 32 is charged by the Doppler signal D2. Similarly, when the second channel is selected by the squarewave signal, the Doppler signal D1 is held by a capacitor 34 coupled to the voltage source VCC and charged by the Doppler signal D1. The resulting substantially continuous Doppler signals are illustrated in FIG. 4a. The Doppler signal D2 is shifted in phase relative to the Doppler signal D1 by an amount that is directly proportional to the distance D between the vehicle 10 and the obstacle 12.

The Doppler signal D1 output of the second channel of the synchronous demodulator 30 is then time shifted by a time delay circuit 35 comprised of a resistor 36 and a capacitor 38 coupled between the regulated voltage VCC and the synchronous demodulator 30. The shifted Doppler signal D1' is provided at the junction of the capacitor 38 and the resistor 36 and is illustrated in FIG. 4a. The time shift provided by the time delay circuit 35 is substantially constant over the Doppler frequency range of the near-obstacle detection system.

The Doppler signal D2 is amplified by an amplifier 40 and the time shifted Doppler signal D1' is amplified by an amplifier 42. The amplifiers 40 and 42 are identical and provide for amplification of the Doppler signals and further may provide for signal limiting.

A pair of comparators 44 and 46 convert the analog signal output of the amplifiers 40 and 42 into a squarewave logic signal having a 50% duty cycle at the frequency of the individual Doppler signals D1' and D2. These squarewave signals are illustrated by the solid line squarewave signal 45 of FIG. 4B extending from time $t_2$ to time $t_5$ and which is associated with the Doppler signal D1' and the squarewave signal 47 of FIG. 4C extending from time $t_3$ to time $t_6$ and which is associated with the time shifted Doppler signal D2. The squarewave signal outputs of the comparators 44 and 46 are coupled to inputs of an exclusive NOR circuit 48 which provides logic output signals as illustrated by the solid line logic signals of FIG. 4D. In general, the output of the exclusive OR gate 48 provides signal pulses that are high during the non-overlapping periods of the Doppler signals D1' and D2. The duration of each pulse of the pulse train output of the gate 48 represents the phase shift between the Doppler signals D1' and D2. The duration of each pulse (such as from $t_2$ to $t_3$ and from $t_5$ to $t_6$) in relation to one half the period of the Doppler signals establishes a duty cycle signal whose duty cycle value represents the phase shift between the Doppler signals D1' and D2.

In the present embodiment, a no object detection circuit 50 provides an output for controlling a switch 52 which is controlled to be conducting or non-conducting depending on whether an obstacle is sensed rearward of the vehicle 10. In general, the no object detection circuit 50 determines the absence of a toggling of the output of the comparator switch 44 to control the switch 52. Assuming an object is present in combination with relative motion to the obstacle resulting in the Doppler signal D2 and a switching in the output of the comparator 44, the no object detection circuit 40 controls the switch 52 to a conducting state to couple the output of the exclusive OR gate 48 to a filter 54.

As previously described, the output of the exclusive OR gate 48 coupled to the filter 54 is a duty cycle signal that is a direct measure of the phase shift between the Doppler signals D1 and D2. Since the phase shift between the Doppler signals D1 and D2 (and therefore between the Doppler signals D1 and D2) is proportional to range, the duty cycle signal is also proportional to range. Also, since the frequency of the Doppler signals D1 and D2 are proportional to the closing rate between the vehicle 10 and the obstacle 12, the frequency of the duty cycle signal of FIG. 4D is also proportional to range. The function of the filter 54 is to convert the duty cycle signal to a DC analog range voltage having a value that is a measure of the distance D.

At low relative velocities between the vehicle 10 and obstacle 12 the frequency of the Doppler signals is low. At near distances, the duty cycle of the duty cycle signal output of the exclusive OR gate 48 is small. For these conditions, in order to provide a DC analog range signal at the output of the filter 54 representing the distance D while at the same time not having excessive ripple, it is necessary for the filter 54 to have a large time constant. For example, this circuit may typically have a ½ second time constant. This large time constant introduces a log, or error, between the duty cycle of the signal at the input to the filter 54 and the analog range voltage output representing the duty cycle value of the input duty cycle when the duty cycle is changing. As the relative velocity between the vehicle 10 and the object 12 increases, the lag or error between the duty cycle and the analog range voltage representation thereof increases. As will be described, the time shift to the Doppler signal D1 provided by the time shift circuit 35 resulting in the Doppler signal D1' compensates for the frequency dependent error introduced by the filter 54 so that the analog signal output of the filter 54 is an accurate representation of the phase shift between the Doppler signals D1 and D2 and therefore the distance D to the object.

The analog range voltage output of the filter 54 representing the range D to the object 12 is provided to a voltage control squarewave oscillator 56 which functions to generate a squarewave signal having a frequency inversely proportional to the range D to the object 12. The oscillator 56 may take the form of an integrator having equal charge and discharge currents. The integrator is controlled so as to be alternately charged from a constant reference signal to the analog range voltage output of the filter 54 and discharged to the constant reference value. The charge and discharge states of the integrator may be controlled by a comparator comparing the integrator output with the constant reference signal when the integrator is discharging and with the analog range voltage when the integrator is charging. The output of the comparator comprises the squarewave output of the oscillator 56. Therefore, the higher the analog range voltage output of the filter 54, the lower the frequency of oscillation of the oscillator 56. As the obstacle 12 becomes closer to the vehicle 10, the analog range voltage output of the filter 54 decreases so that the charge and discharge times between the reference value and the analog range voltage decreases resulting in an increase in the frequency output of the oscillator 56.

The signal output of the oscillator 56 is coupled to a driver circuit 58 through an OR gate 60. The driver 58 output in turn drives a visual indicator such as a lamp 62 and an audible indicator such as a piezoelectric buzzer 64. Assuming the second input (to be described) to the OR gate 60 is a logic 0, the output of the voltage control squarewave oscillator 56 periodically energizes the buzzer 64 and the lamp 62 at a frequency that is inversely proportional to the range D to provide a visual and audible indication to the operator of the presence of an obstacle and through the observation of the frequency of the visual or audio signals the relative distance D of the obstacle 12 from the vehicle 10.

The preferred embodiment of the invention further includes an out-of-range detector 66 that functions to limit the maximum distance and therefore minimum frequency output of the voltage control squarewave oscillator. This limit is provided simply by measuring the amplitude of the analog output of the filter 54 representing range and limiting the signal input to the voltage control squarewave oscillator 56. The system further includes a diagnostic comparator 68 that monitors the DC offset level of the IF signal. If the DC offset is greater than a predetermined certain level indicating a blocked antenna, the diagnostic comparator 68 supplies a logic 1 signal to the OR gate 60 whose output is maintained at a high level to continuously energize the buzzer 64 and the lamp 62 to provide an indication of the blocked antenna.

To illustrate the invention, it will first be assumed that the time shift circuit 35 is not provided. With this condition, the Doppler signal D1 is passed to the amplifier 42 resulting in the dotted line squarewave signal 70 of FIG. 4B beginning at time $t_1$ and ending at time $t_4$. The resulting duty cycle signal at the output of the exclusive OR gate 48 is represented in the diagram 4D by the digital pulses extending from time $t_1$ to time $t_3$ and from time $t_4$ to time $t_6$. The duty cycle represented by these pulses is a direct and accurate measure of the actual range D between the obstacle 12 and the vehicle 10. The filter 54 then converts the signal to the DC analog range signal previously described. However, due to the large time constant of the filter 54, the range represented by the analog range signal value lags the actual distance represented by the duty cycle output of the exclusive OR gate 48. As a result, the distance represented by the analog range signal is too large as the distance decreases. As indicated, the amount of the lag and therefore error in the range represented by the analog range signal increases with increasing closing velocities between the vehicle 10 and the obstacle 12. Particularly, as the vehicle is backing up toward the obstacle 12, the duty cycle of the signal output of the exclusive OR gate decreases at a rate dependent on the closing velocity. However, the decrease in the analog range signal output of the filter 54 lags the decrease in the duty cycle by an amount dependent on the closing velocity so that the analog signal output of the filter 54 represents a greater than actual value of the range D. Therefore, the frequency of the oscillator 56 and therefore of the buzzer 64 and lamp 62 will represent a range that is greater than the actual range.

This invention provides for a compensation to the Doppler frequency error introduced by the filter 54 by introducing the constant time shift in the Doppler signal D1 by the time shift circuit 35. This delay results in the phase delayed signal D1' which in turn results in the artificial decrease in the duty cycle of the duty cycle range signal from the gate 48. This decrease in duty cycle is illustrated in FIG. 4D wherein the pulse width for the same distance D is decreased from $t_1$ to $t_3$ to $t_2$ to $t_3$ and from $t_4$ to $t_6$ to $t_5$ to $t_6$. This artificial decrease in the duty cycle output of the exclusive OR gate 48 functions to decrease the value of the analog range signal output of the filter 54 to compensate for the error introduced by its large time constant. As can be seen, the constant time delay imposed by the time shift circuit 35 in conjunction with the increasing frequency of the Doppler signals D1 and D2 as the relative velocity between the vehicle 10 and obstacle 12 increases provides a velocity dependent compensation. By proper selection of the time shift provided by the circuit elements 36 and 38, the phase shift to the Doppler signal D1 can be sized to compensate for the lag of the duty cycle to DC converter in the form of the filter 54 over the complete range of relative velocities between the vehicle 10 and the obstacle 12.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A Doppler radar system for a vehicle for indicating a distance between the vehicle and an obstacle as the vehicle-approaches the obstacle, the system comprising in combination:

means for transmitting a radar signal alternately at first and second frequencies;

means for receiving the transmitted radar signal reflected from the obstacle;

means for mixing the transmitted and received radar signals to generate first and second Doppler signals having a phase difference that is a measure of the distance to the obstacle and each having a frequency varying directly with the rate that the vehicle is approaching the obstacle;

means for generating a duty cycle signal comprised of repeated pulses having a frequency varying directly with the frequency of the Doppler signals and each having a duration equal to a first time equal to the phase difference between the Doppler signals and therefore being a measure of the distance to the obstacle minus a second time so that the duty cycle signal represents the distance to the obstacle minus an offset distance determined by the second time, the offset distance determined by the second time being directly related to the rate that the vehicle is approaching the obstacle; and a filter for converting the duty cycle signal to an analog signal having a value representing the distance between the vehicle and the obstacle, the filter having a predetermined time constant resulting in the distance represented by the value of the analog signal being greater than the distance represented by the duty cycle signal by an amount directly related to the rate that the vehicle is approaching the obstacle, the second time being equal to a predetermined constant value so that the offset distance is substantially equal to the lag in the distance represented by the value of the analog signal, whereby the analog signal provides an indication of the distance to the obstacle.

2. The Doppler radar system of claim 1 further including (A) means for converting the analog signal to a pulse signal having a frequency inversely proportional to the value of the analog signal and (B) indicator means energized by the pulse signal to provide a variable frequency indication of the distance to the obstacle, the frequency of the variable frequency indication of the distance increasing with a decreasing distance to the obstacle.

3. A Doppler radar system for a vehicle for indicating the actual distance between the vehicle and an obstacle as the vehicle approaches the obstacle, the system comprising in combination:

means for transmitting a radar signal alternately at first and second frequencies, the second frequency being less than the first frequency;

means for receiving the transmitted radar signal reflected from the obstacle;

means for mixing the transmitted and received radar signals to generate first and second Doppler signals D1 and D2 corresponding respectively to the first and second frequencies, the Doppler signal D2 having a phase difference from the Doppler signal D1 that is a measure of the actual distance to the obstacle and each Doppler signal D1 and D2 having a frequency varying directly with the rate that the vehicle is approaching the obstacle;

means for delaying the Doppler signal D1 by a predetermined constant time to generate a Doppler signal D1', Doppler the signals D1' and D2 having a phase difference less than the phase difference between the Doppler signals D1 and D2 that increases with increasing frequencies of the Doppler signals D1 and D2 so that the phase difference between the Doppler signals D1' and D2 represents an artificial distance less than the actual distance by an amount that increases with increasing frequencies of the Doppler signals D1 and D2;

means for converting the Doppler signals D1' and D2 to first and second squarewave signals, respectively, the first and second squarewave signals having non-overlapping periods that are a measure of the phase difference between the Doppler signals D1' and D2;

means for generating a pulse signal during each of the non-overlapping periods of the first and second squarewave signals to form a duty cycle signal having a duty cycle that is a measure of the phase difference between the Doppler signals D1' and D2 and therefore the artificial distance; and a filter for converting the duty cycle signal to an analog signal representing the distance between the vehicle and the obstacle, the filter having a predetermined time constant resulting in the distance represented by the analog signal lagging the artificial distance represented by the duty cycle signal by an amount directly related to the rate that the vehicle is approaching the obstacle, the predetermined constant time having a value so that the amount that the artificial distance is less than the actual distance is substantially equal to the lag in the distance represented by the analog signal, whereby the analog signal provides an indication of the distance to the obstacle.

* * * * *